US006907000B1

(12) United States Patent
Host

(10) Patent No.: US 6,907,000 B1
(45) Date of Patent: Jun. 14, 2005

(54) ADVANCED PACKET TRANSFER WITH INTEGRATED CHANNEL MONITORING

(75) Inventor: Lawrence William Host, Jemez Springs, NM (US)

(73) Assignee: Tierra Telecom, San Diego, CA (US)

( * ) Notice: Subject to any disclaimer, the term of this patent is extended or adjusted under 35 U.S.C. 154(b) by 775 days.

(21) Appl. No.: 09/591,897

(22) Filed: Jun. 12, 2000

(51) Int. Cl.[7] .............................. H04J 3/14; H04L 12/56
(52) U.S. Cl. ...................... 370/228; 370/248; 370/356; 709/239
(58) Field of Search ................................ 370/241, 225, 370/228, 248, 252, 400, 352, 353, 356; 709/239

(56) References Cited

U.S. PATENT DOCUMENTS

| | | | | |
|---|---|---|---|---|
| 6,253,249 B1 | * | 6/2001 | Belzile | 709/249 |
| 6,301,223 B1 | * | 10/2001 | Hrastar et al. | 370/227 |
| 6,466,548 B1 | * | 10/2002 | Fitzgerald | 370/249 |
| 6,490,252 B1 | * | 12/2002 | Riggan et al. | 370/237 |
| 6,542,499 B1 | * | 4/2003 | Murphy et al. | 370/352 |
| 6,560,654 B1 | * | 5/2003 | Fedyk et al. | 709/239 |
| 6,590,869 B1 | * | 7/2003 | Beyda et al. | 370/248 |
| 6,600,735 B1 | * | 7/2003 | Iwama et al. | 370/352 |
| 6,690,651 B1 | * | 2/2004 | Lamarque et al. | 370/252 |

OTHER PUBLICATIONS

DataBeam Corporation, *A Primer on the H.323 Series Standard*, May 15, 1998, pp. 1–16.

* cited by examiner

Primary Examiner—Min Jung
(74) Attorney, Agent, or Firm—Nath & Associates PLLC; Gary M. Nath; Robert P. Cogan

(57) ABSTRACT

A method and apparatus for transmitting packets of data over a packet-switched network and for monitoring the transmission characteristics associated with the transmission is disclosed. In one configuration the method and apparatus is configured to interface with a telephone network, such as the public switched telephone network. In such a configuration, two or more interface devices located at different locations connect to a computer network, such as the Internet and to a telephone network. The interface devices receive information from the telephone and manipulate this information and transmits it over a computer network to another interface device. Also included is monitoring and routing software located on any of the interface devices or a separate monitoring and routing system. The monitoring and routing software is in communication with each interface device to obtain information regarding the communication characteristics between each of the one or more interface devices. If the communication characteristics are undesirable, the monitoring and routing software may communicate with the one or more interface devices to achieve a change in routing of the information over the computer network.

9 Claims, 11 Drawing Sheets

ADVANCED PACKET TRANSFER WITH INTEGRATED CHANNEL MONITORING

FIELD OF THE INVENTION

The present invention relates generally to data communications and in particular to a method and apparatus for transfer of time and quality sensitive information over an electronic network.

BACKGROUND OF THE INVENTION

The worldwide demand for communication capability continues to increase due the advancement of areas undeveloped previously and the growth and expansion of businesses in already established areas. Moreover, homes or offices previously equipped with a single telephone line are now more likely to install two or even three lines to facilitate simultaneous communication by individuals or devices within the home or office.

At the same time, competition between long distance carriers has increased thereby reducing profitability in providing traditional long distance telephone service. There are also few market entrants due to this reduced rate of return in exchange for the large capital investment required to build out complex worldwide telephone transmission facilities. This further limits competition.

As is commonly understood, a caller intending to place a call, such as for example, a call from the West coast to the East coast utilizes traditional POTS to facilitate the call. As shown in FIG. 1, a caller utilizes a telephone 120 to gain dial-tone from a central office 122. One or more central offices serve a plurality of customers within a local access transport area (LATA) 140. The central office 122 provides dial tone to the caller. Upon receiving a request for a call, the central office decodes the dialed numbers. In this example the central office 122 detects a long distance call in to a distant location and accordingly forwards the call to a toll office 126 to complete the call. The central office and toll office determine the long distance service provider associated with the caller and initiate proper billing and responsibility for the call. The toll office utilizes SS7 signaling on lines 130 to setup the communication channel to one or more other toll offices 132. As is known by those of ordinary skill in the art, SS7 signaling utilizes common channel signaling (CCS) to first obtain and dedicate voice trunks 130 to the dialed number via a second toll office 132, a second central office 142 to a remote telephone 144. After SS7 establishes a completed path of voice trunks to the dialed number, it activates the voice trunks, initiates the ring process of the dialed number and drops off the call to assist 20 establishment of another call. It should be noted that after the SS7 dedicates the voice trunks and activates the voice channel, its interaction with the call is over and the call proceeds as a standard direct connection between two remote terminals. In this manner, the exchange of conversation or data may occur.

In many calls determined to be long distance, which is to say calls out of a LATA area 140, the call crosses one or more LATA lines 124. A LATA (Local Access and Transport Area) line 124 comprises a dividing line between one of the 196 arbitrarily designated zones in which a local telephone company, such as a Local Exchange Carrier, may originate and complete telephone calls. Calls that cross a LATA line have historically been required to be handled by a long distance telephone company, such as AT&T, MCI, or Sprint. While such systems served their purpose well, the increased demand for telecommunication services has placed greater demands on the existing system. One drawback of the present telecommunication system operating under the SS7 standard is the poor utilization of available bandwidth on an active voice trunk. Once the prior art system establishes a voice channel, that particular voice channel is dedicated to a single particular conversation. Such a method of operation poorly utilizes voice channels, voice being a data stream in which long periods of silence occur and only requires limited bandwidth and which is greatly compressible.

Another drawback of prior art systems is the high cost of adding additional resources. To add additional voice channels additional cables must be installed and expensive equipment utilized to facilitate communication over each of the one or more newly installed cables. These costs can be substantial.

A further disadvantage to such prior art systems is their congregation in the control of a few large and powerful corporations. These corporations control the market on calls which must cross LATA lines because they have the facilities to complete these calls. For example, a telephone line subscriber may designate one of numerous small to mid-sized long distance carriers as the long distance service provider for a telephone line. The a subscriber may select a particular carrier for any reason such as price, advertising, or other incentive. However, these long distance carriers are often organizations without actual long distance capability and hence must purchase long distance access in bulk from one of the large long distance service providers to complete calls that cross a LATA boundary. Because the large long distance service providers control the market, the small to mid-sized carrier may be forced to pay higher rates than the large long distance service providers. This is yet another factor that limits competition.

Yet another drawback to the prior art system of providing long distance communication service is one or more governmental fees that may be imposed as a result of governmental regulation.

While existing prior art systems could be expanded, such expanded systems would undesirably suffer from the drawbacks described above.

In response to these and other drawbacks, other methods and apparatuses have been proposed to facilitate local and inter-LATA communications. One such proposal is to transmit voice information in data packets, utilized by a packet-switched network, such as the Internet. As also shown in FIG. 1, the central office 122 may connect to an Internet Service Provider (ISP) which in turn connects to a worldwide configuration of computers 150. One example of such a worldwide configuration of computers is the Internet 150. In such a system a user at a first computer terminal 156 would dial-up an ISP 152 via a central office 122 in a manner known in the art. The first computer terminal 156 includes software and a voice input device to transform speech data to data in the form of data packets as is commonly utilized in an IP packet-switched network. The first computer terminal 156 transmits these packets to the ISP 152 wherein the packets are further transmitted via the Internet 150 to a second ISP 152 and then on to a computer terminal 158. Software and hardware on the second computer terminal 158 decode the incoming packets and regenerate a speech signal intended to resemble the original signal from a user at the first computer terminal 156. Conversation or other types of real time data exchange between parties is proposed to occur in this manner. This type of system is often referred to as voice-over-IP communication. Indeed, an entire standard has been dedicated to voice-over-IP, commonly referred to as H.323.

The voice-over-IP method of the prior art and the H.323 standard also suffer from numerous disadvantages. Most notably, prior art voice-over-IP systems provide unacceptable quality of communications because of data loss in packets progressing via the Internet and because of delays associated with transmission via the Internet.

Moreover, voice-over-IP requires special equipment by at least one of the participants in the exchange and subscription to an ISP. As a result, prior art voice-over-IP is prohibitively expensive, inconvenient and complicated.

The present invention overcomes the disadvantages associated with the prior art and provides a new method and apparatus to achieve communications.

SUMMARY OF THE INVENTION

One aspect of the invention is directed to a method and apparatus for interfacing with a communication system to facilitate transmission of data from a first location to a second location.

The invention described herein overcomes the drawbacks in the prior art by providing a method and apparatus to facilitate the transmission of telecommunications over a packet-switched network, packet-based transmission system, or other medium separate from the voice telephone network. One advantage of the invention is reduced cost of telecommunications due to use of an Internet packet-switched network. Another advantage of the invention is monitoring of optimal routing paths a prior to call set-up. Another advantage of the invention comprises monitoring of the communication session in real time for quality. Another advantage of the invention comprises re-routing of the communication session to an alternate path to maintain communication quality. Yet another advantage of the invention comprises use of least-cost-routing analysis to determine path selection within the computer network. In one configuration, least-cost-routing determines the path that results in the lowest charges being assigned to the call from completion over aspects of the public switch telephone network (PSTN).

In one configuration two or more Interfaces are located at various desired locations throughout the world. The Interfaces are enabled to communicate over a communication medium, in one embodiment the Internet. One or more Monitoring and Routing systems (M/R system) may optionally interact with the two or more Interfaces to serve as a central manager or network operations center.

The M/R system communicates with the Interfaces to evaluate the communication path characteristics between the various Interfaces. In one configuration the evaluation is based on feedback from the Interfaces regarding test packets or ping packets sent between the Interfaces to determine path characteristics and an analysis of any type of packet sent between Interfaces. The M/R system's evaluation determines the optimal routing between Interfaces.

In one configuration the Interface comprises a combination of hardware and software having systems that communicate and interact with a telephone network and having further systems to communicate and interact with a computer network, such as the Internet. In one configuration the M/R system comprises a combination of hardware and software configured to communicate and interact with a computer network.

In operation the Interface receives calls or other requests for services from another communication network, such as the PSTN. Upon receipt, the incoming call provides destination information and call data. The Interfaces, in conjunction with the M/R system, process the incoming call and utilize the destination information to determine a destination Interface. Optional variable compression may be performed on the call. The Interface converts the call data to packets having header information determined by the call destination. Thereafter, the Interface transmits the call in packet form on a computer network for receipt by a destination Interface.

At the destination Interface, the Interface receives the packets and reconstructs the call from packet form for communication back on the telecommunication network so the call may be delivered to the call destination.

One desirable feature of the invention comprises monitoring of the communication path on the computer network for path or route quality. If the monitoring reveals the route or path is not providing acceptable transmission characteristics the invention is able-to re-route the call-to another path on the computer network to improve communication quality.

Further objects, features, and advantages of the present invention over the prior art will become apparent from the detailed description of the drawings which follows, when considered with the attached figures.

DETAILED DESCRIPTION OF THE INVENTION

The invention is a method and apparatus for transmission of time and quality sensitive data. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. Moreover, it is contemplated that the various elements of the present invention may be utilized alone or in any manner or combination.

Example Environment

Figure 1:
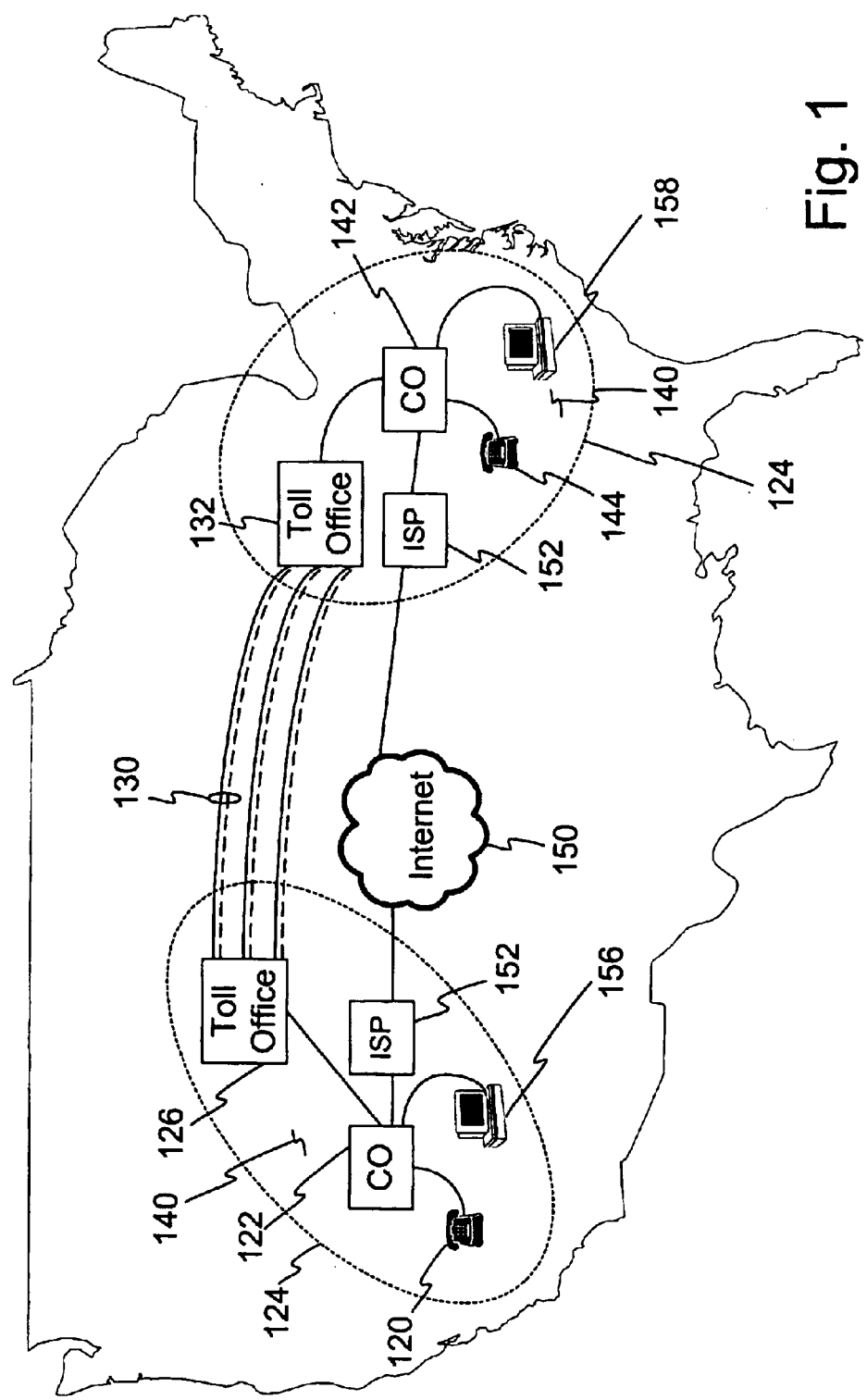
FIG. 1 illustrates an exemplary prior art configuration for achieving long distance communication.
Figure 2:
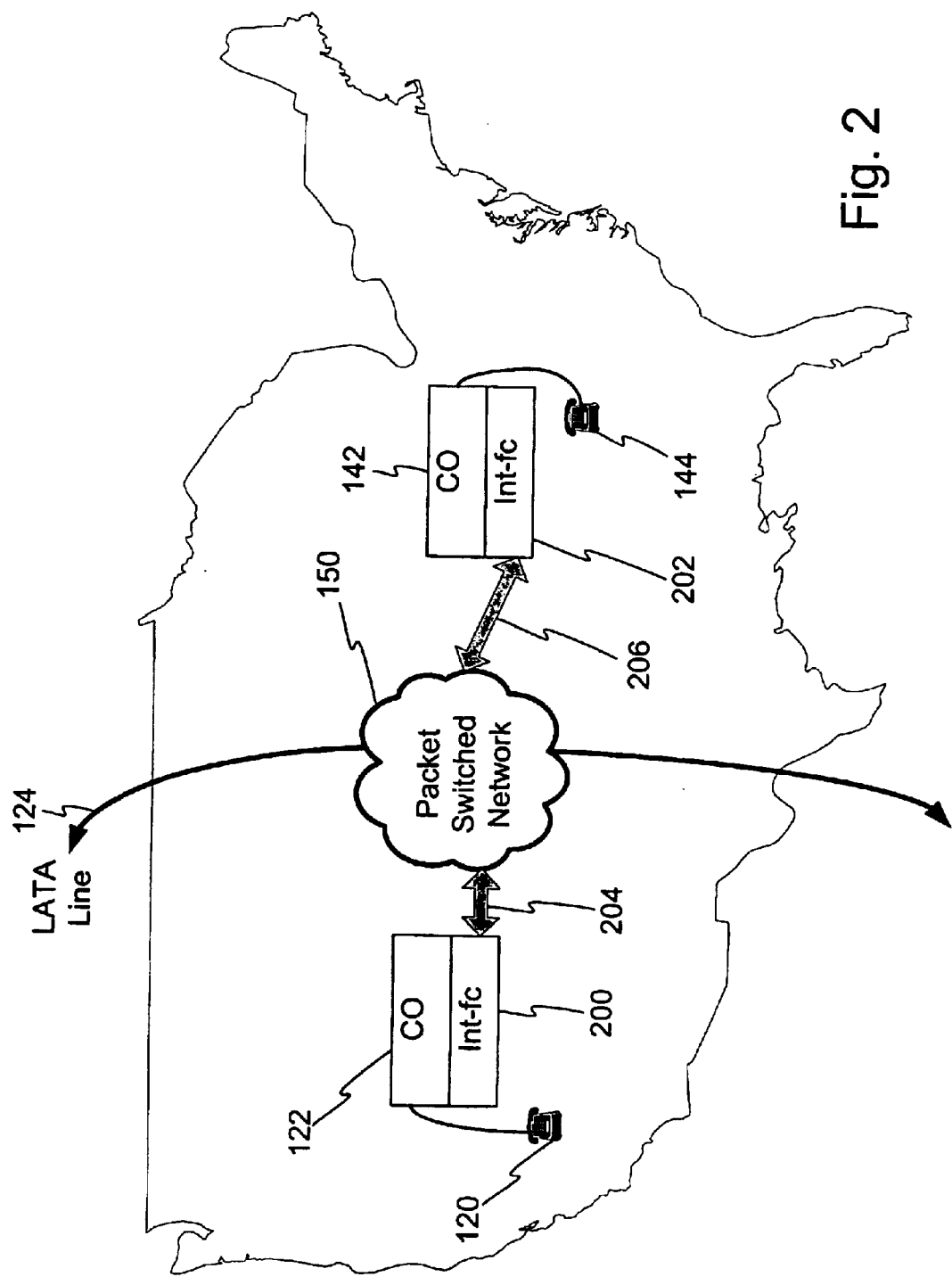
FIG. 2 illustrates a block diagram of an example integration of the present invention into communication systems.

For purposes of understanding, the present invention is first described in an example environment well suited for use of the present invention. FIG. 2 illustrates an example environment of a telephone network. In comparison to FIG. 1, like elements are labeled with like reference numerals. As shown, a communication device, such as telephones 120, 144 connects to a central office 122, 142 via a local loop or any other communication medium. Internal to each central office 122, 142 is the Interface 200, 202 (Voice/Packet Interface) of the present invention. The equipment of the central office 122, 142 responsible for receiving and routing the incoming call is configured in communication with the Interface 200, 202. Generally similar configurations exist in central office 122 and central office 142. As the configuration of the central office 122, 142 is generally understood by those of ordinary skill in the art, a detailed description is not provided herein.

Each of the Interfaces 200, 202 are configured to facilitate communication between the systems of the central office and a computer network, such as by way of example the Internet 150. Connecting the Interfaces 200, 202 and the Internet 150 are high speed, high capacity communication media 204, 206. It is contemplated that the communication path between Interface 200 and VIP Interface 202 may cross or intersect one or more LATA lines 124.

Example Embodiments

Figure 3:
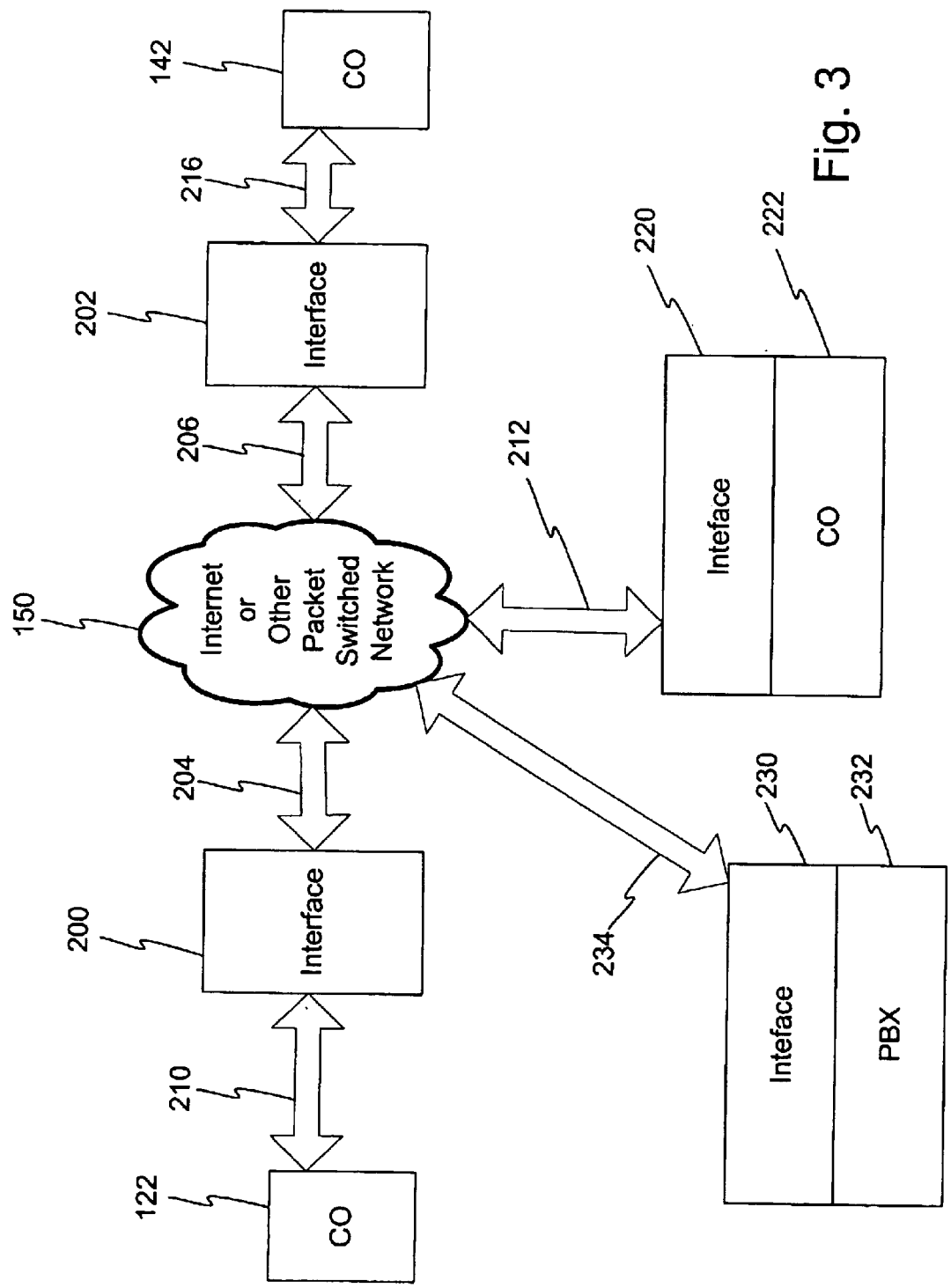
FIG. 3 illustrates a block diagram of an alternative configuration for integration of the present invention into a communication system.

FIG. 3 illustrates a block diagram of the present invention's linkage with existing systems of a telecommunication system wherein more than two Interfaces 200, 202, 220, 230 are enabled for operation. In comparison to FIG. 2, like elements are referenced with like reference numerals. As shown in this figure, the Interface 200 and Interface 202 are located remotely from central office 122, 142 and connected to each other by high speed and high capacity communication media 210, 204, 206 216. In one embodiment the communication capacity comprises T-1 capacity. In another embodiments the communication capacity may comprise T-3, T-4, E-1, E-3, or OC-3 capacity. Other communication media that can be utilized include wireless, microwave, satellite links, and fiber optics.

Also shown in FIG. 3 is additional Interface 220 communicating with the Internet 150 via high speed and high capacity lines 212 and interfacing with a third central office 222.

Also shown in FIG. 3 is a fourth Interface 230 in communication with a private branch exchange (PBX) 232. The PBX 232 communicates with the Internet or other packet-switched network via an additional communication medium 234. The term PBX is used herein to mean any communication system providing communication capability to any number of individuals or devices. It is further contemplated that any number of Interfaces and central office and PBX may be combined in any number or any combination to facilitate communication in the manner described herein or equivalents thereto.

In operation, the first central office 122 is able to communicate with either the second central office 142 or the third central office 222, or the PBX 232 via the Internet 150 using the apparatus of the invention. Desirably, the Interfaces 200, 202, 220, 230 include means to interface with a telephone network to thereby serve as a conduit to complete telephone calls or other communication requests at, for example, the first central office 122 to any of the other central offices 142, 222 or PBX having associated Interface.

Figure 4:
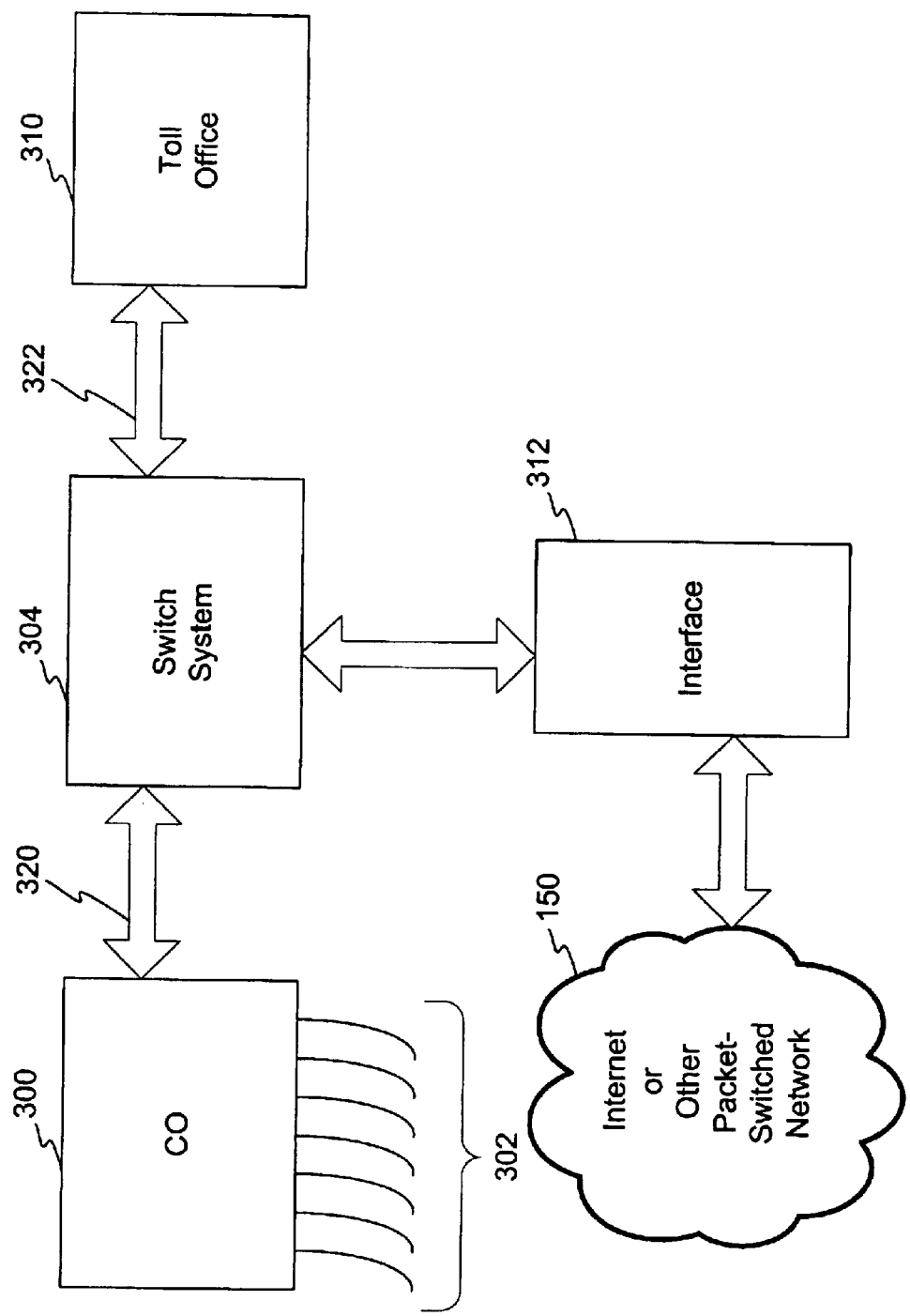
FIG. 4 illustrates a block diagram of an alternative configuration for integration of the present invention into a communication system.

In yet another embodiment the present invention interfaces with a switching system 304 separate from the central office. FIG. 4 illustrates a block diagram of the Interface of the present invention with a switching system 304. As shown, a central office 300 includes a number of associated local loop lines 302 and a communication path 320 with a secondary switch system 304. The secondary switch system 304 may be publicly or privately owned and operated.

The communication path between the CO 300 and the switch system 304 may comprise a single communication path or multiple communication paths. Incoming calls arriving at the switch system 304 from the central office 300 are referred to herein as the mother calls where calls exiting the switch system 304 to the central office after processing by the switch system are referred to herein as daughter calls.

Also in communication with the switch system 304 are one or more toll offices 310 and one or more Interfaces 312. Communication between the toll office or the Interface 312 occurs on high speed, high capacity communication media such as a T-1 Line. The Interface 312 also communicates with a network such as the Internet 150.

In this discussion of example operation it is assumed that the switch system 304 is operated by a vendor of long distance services and/or long distance calling cards. As a result, a user of one or more of the lines 302 may dial a number to obtain long distance service via switch system 304. Mother calls via lines 302 are carried through the central office to communication path 320 to the switch system 304. The switch system 304 processes the call and may optionally process call data such as payment information or access authorization. Thereafter, the switch system 304 allows or disallows the call. In systems of the prior art, allowed calls are routed out as daughter calls to either of the central office 300 or a toll office 310 to gain access to long distance routing and transport services, being offered by larger long distance service carrier, to complete the call to a distant central office. Using the invention described herein, the call can be routed to the Interface 312 for completion. In one scenario the switch 304 operator/owner offers long distance calling service. Because they often buy long distance service in bulk, they may offer a desirable rate to consumers of their service. In systems of the prior art, switch system 304 was forced to utilize the service of a limited number of long distance carriers to complete the calls.

Utilizing the Interface 312 of the present invention the switch system 304 may connect directly to the Interface via a high speed, high capacity medium such as a T-1 for transmission of calls in a packet form via a packet-switched network 150. It is contemplated that a similar configuration exists on the terminating side of the call at the remote location, at least to the extent of another Interface 312 to receive the data from the packet-switched network 150 (Internet) and thereby transfer the call to an appropriate telephone system for completion. This bypasses the need to obtain long distance service from a third party. In this manner the switch system 304 is provided an alternative method and apparatus to complete long distance calls. It is fully contemplated that in various other embodiments the present invention will be utilized to complete calls defined as local calls.

It is also contemplated that one or more Interface of the present invention are co-located within Competitive Access Providers (CAP) to gain access to the communication channels of the CAP and to provide an alternative means of long distance call transmission from an originating office to a terminating office.

Figure 5:
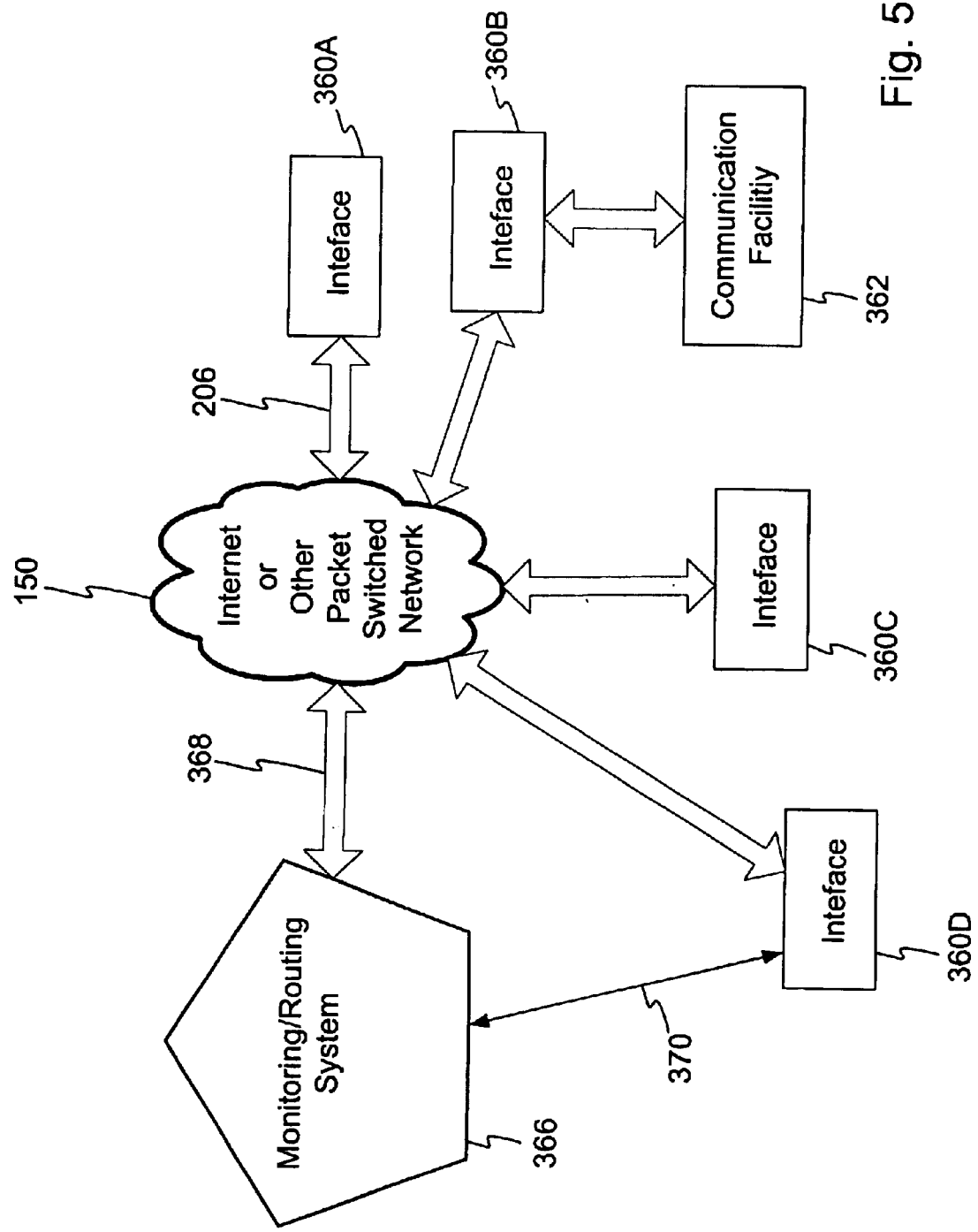
FIG. 5 illustrates an example embodiment of the present invention including two or more Interfaces with a Monitoring/Routing system.

FIG. 5 illustrates a block diagram of an example embodiment of the present invention including interface with a monitoring/routing system. As shown, one or more Interfaces 360 communicate via the Internet 150 to facilitate packet transfer there between. It is also contemplated that one or more of the Interfaces 360 communicate with a communication facility 362. The communication facility could include, but is not limited to, a central office, a local exchange carrier, a competitive access provider, Internet service provider, or any site in which Internet access and PSTN access is provided.

Also shown in FIG. 5 is a monitor and routing system (M/R system) 366. The M/R system 366 comprises a computerized control system configured to interface with one or more of the Interfaces 360 via either of a connection 368 to the Internet 150, or via a direct connection 370. The connection 368 and direct connection 370 may comprise any method, apparatus, or medium configured to communicate information between remote electronic devices.

The M/R system 366 performs a plurality of tasks to oversee operation and facilitate communication among each of the one or more Interfaces 360.

In particular, the M/R system of the present invention may be configured to control route selection between Interfaces 360, track billing, execute least-cost-routing algorithms, monitor channel path quality, and control re-route and transmission parameter decisions. Each of these is discussed in greater detail below. However, for purposes of understanding, a brief overview is immediately presented.

The M/R system 366 acts as controller for each of the Interfaces 360. To effectuate control, the M/R system 366 communicates with an Interface 360 using data packets transmitted via the Internet or other computer network 150 as is known in the art. For example, when an Interface 360A is presented with a call on an incoming channel it notifies the M/R system 366. The M/R system 366 establishes a billing record, and determines which of the other Interfaces is the closest destination, in the example, Interface 360D.

Figure 6:
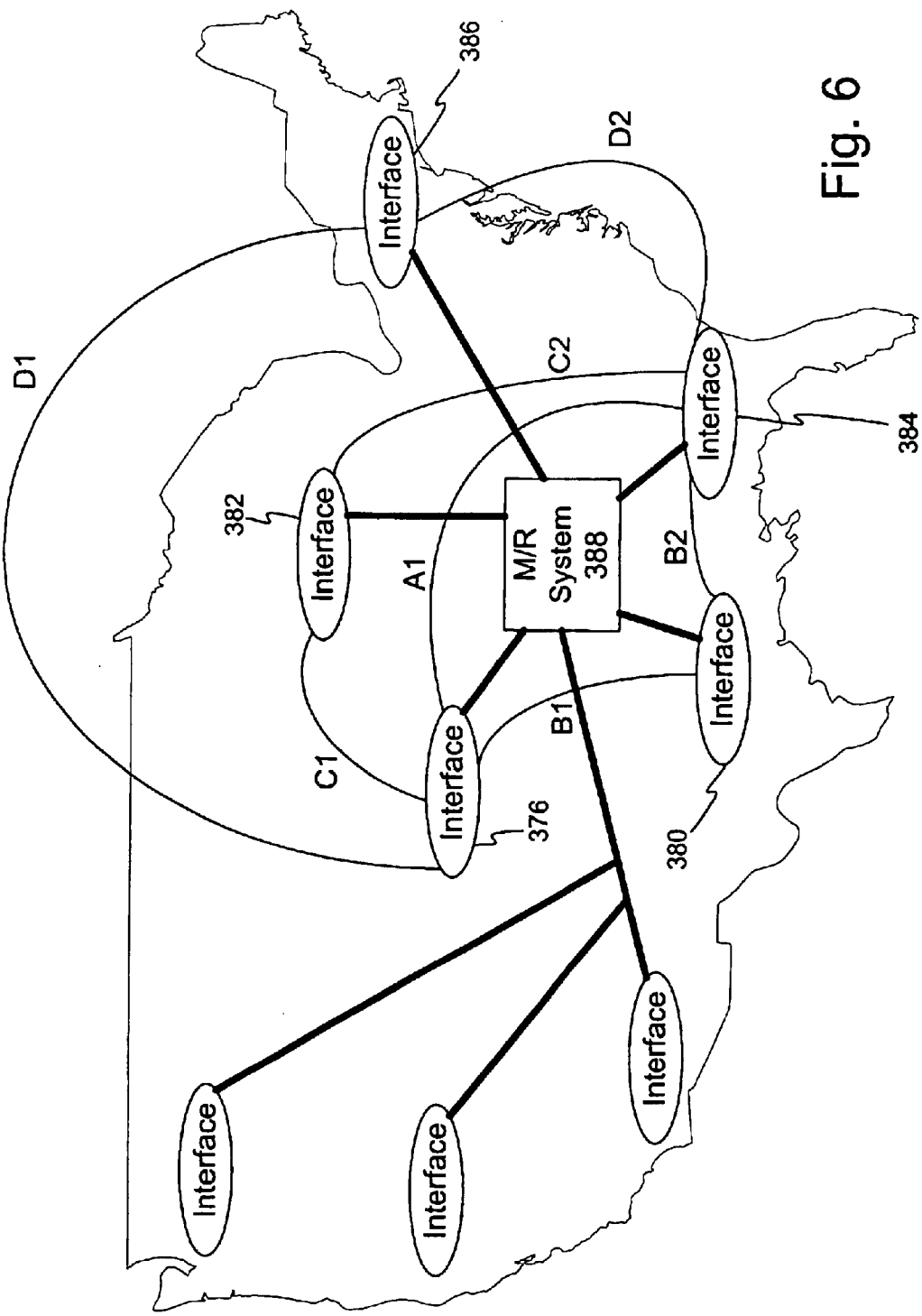
FIG. 6 illustrates an plurality of exemplary routing paths in a example configuration of two or more Interfaces and a Monitoring/Routing system.

The M/R also performs route selection based on testing done on the possible routes between the source Interface and the destination Interface. The M/R system achieves this testing by sending test packets between the various Interfaces. FIG. 6 illustrates a block diagram of a plurality of routes between two or more Interfaces. In one embodiment the testing comprises the sending of ping or other path characteristic packets. As shown, Interfaces 376, 380, 382, 384, 386 are in communication with each other with an M/R system 388. It is contemplated that this communication occurs over a packet-switched network, the Internet, or a direct connection.

To determine path characteristics, the M/R system initiates the sending of ping or other test packets from one Interface to another Interface. By way of example, if Interface 376 must route an incoming call to Interface 384, the M/R system utilizes the data obtained from the test packets to determine which route yields the most desirable path. One example path is directly on path A1 from Interface 376 to Interface 384. Another alternate path is path B1–B2 from Interface 376 to Interface 384. Yet another possible path is path C1–C2 through Interface 382. By utilizing data obtained from the test packets, the M/R system determines the best path to route packets containing important data to complete the call. In one embodiment the communication medium between each of the Interfaces and/or the M/R system comprises the Internet. It is contemplated that the M/R system continually monitors the characteristics of the various paths between each Interface. This allows the M/R system to analyze and select the most desirable path to route and/or re-route calls or communication sessions.

In further reference to FIG. 5, the M/R system 366 instructs the Interface 360A to address packets containing call information to Interface 360D. During the call the Interface 360A, 360D obtains data regarding the call and forwards this data to the M/R system 366. The M/R system 366 analyzes the call data for channel quality. If the quality of the channel, i.e. path over which the packets containing call data travel degrades to an unacceptable level, the M/R system 366 re-routes the call to a better path. In one method of operation, a different path is achieved by routing the packet through a different Interface one of the Interfaces 360B, 360C thereby causing the packets to take a different path.

Yet another desirable feature of the invention comprises least-cost-routing. It is contemplated that in some situations, there may not be an Interface close in location to the final call destination. Thus, to achieve call completion, the call is first routed to an Interface and then completed using standard PSTN operation. To achieve least-cost-routing, the M/R system analyzes the cost associated with completing the call via the PSTN from the destination Interface to the call destination when determining which Interface to designate as the destination Interface. Thus, the M/R system reduces the costs associated with utilizing the PSTN, wherein charges must be paid to another long distance carrier for call completion, to reduce the overall cost of the call.

Before discussing in greater detail the operation, features and advantages of the present invention, a discussion of the configuration and operation of a Interface 360 and a M/R system 366 is provided.

Figure 7:
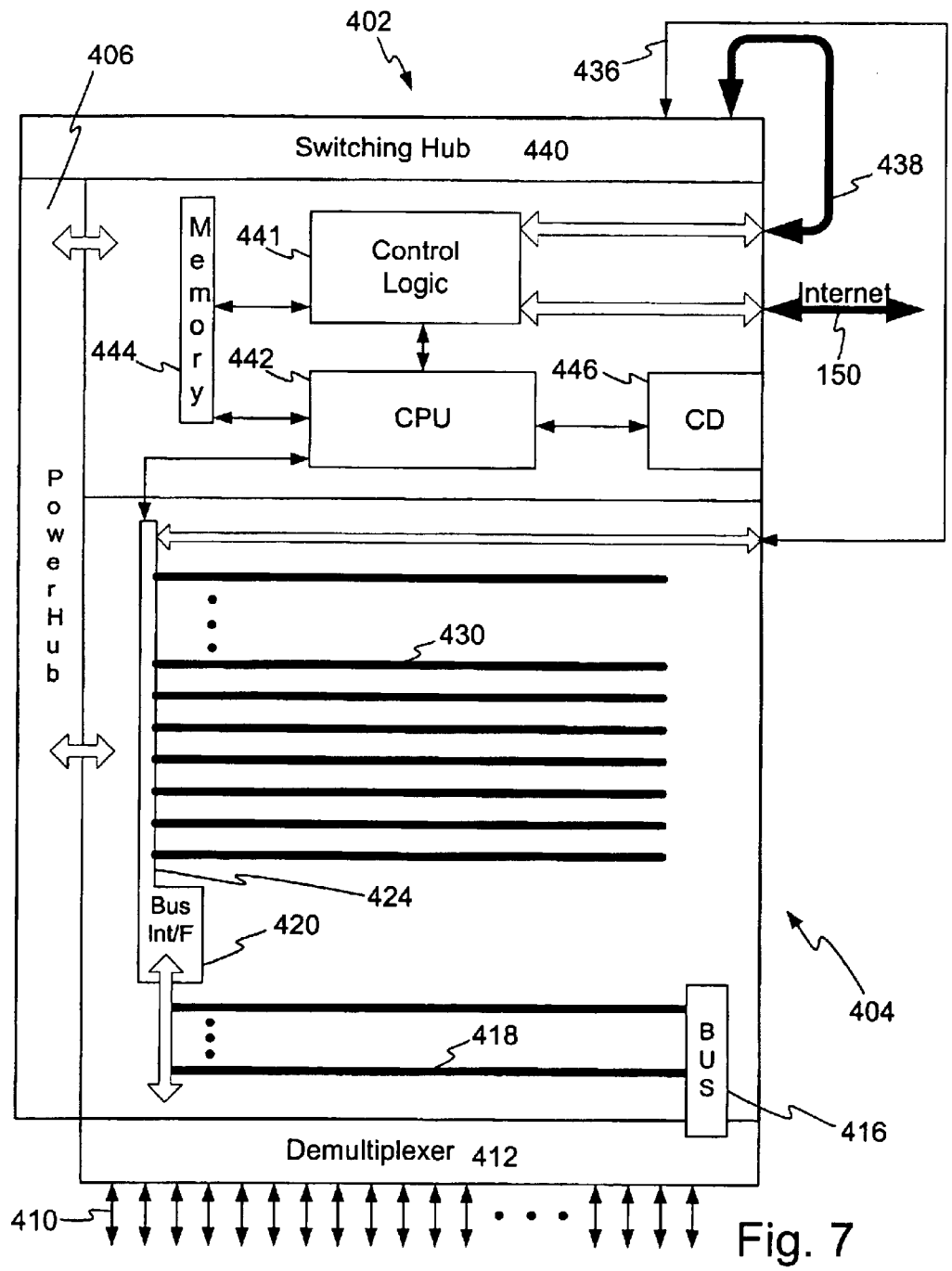
FIG. 7 illustrates an example embodiment of the voice packet interface as described herein.

In reference to FIG. 7, an illustration of a block diagram of an example embodiment of an Interface is shown. Broadly, the Interface comprises a switching systems 402 (top portion of FIG. 7), telephony system 404 (bottom portion of FIG. 7) and associated power supply and a control system (power system) 406. In general, the switching system 402 comprises software, logic and memory systems configured to interface with a computer network, such as the Internet, to receive, transmit and process data. In one embodiment the data are in the form of data packets configured in accordance with IP protocol. The switching systems also communicate with the M/R system, described below in greater detail.

In general, the telephony subsystem 404 comprises electronics configured to communicate with a telephone system, such as the systems of a central office, PBX, or stand-alone switch. The telephony subsystem 404 also communicates with the switching system 402 to facilitate conversion of analog data, such as voice data, to data packets.

Both the switching system 402 and the telephony system 404 receive power from a power hub 406. Systems configured to supply power to one or more electronic systems are known by those of ordinary skill in the art and accordingly are not discussed herein.

For purposes of understanding, the apparatus of the Interface is now described in the order in which an incoming call from the PSTN encounters each device in the Interface 360. Turning to the bottom portion of the FIG. 7, one or more high capacity lines 410 connect to a de-multiplexer 412. It is contemplated that the lines 410 comprise any form of communication media for transferring incoming data to the systems of the present invention. In one embodiment, each line 410 comprises a T-1 line. As is commonly understood, T-1 lines have increased bandwidth capacity and hence increased data carrying capability thereby allowing the capacity of the present invention to be utilized. In one embodiment the Interface includes ports to connect to one or more T-3 cables and thus has about 672 lines per port for a maximum capacity equivalent to 1344 input/output lines. In an alternative embodiment, the Interface comprises means to connect to 1 to 56 T-1 lines. This equates to 24 ports per T-1 line for a total of 1344 total line capability. In yet another embodiment, the system comprises 1 to 40 E-1 lines, each having 30 ports for a total of 1200 ports.

The de-multiplexer 412 separates the multiplexed signals on the telephone lines in a manner known in the art and thereafter provides these signals on a de-multiplexer bus 416. Connecting to the de-multiplexer bus are one or more T-X processing cards 418. In one embodiment, each T-X card comprises a T-3 card having network interface capability. In such an embodiment, a T-3 card, in North America and Japan, is equivalent to 28 T-1 channels, operating at a signaling rate of about 45 Mbps. Thus, in a channelized application the T-3 cards supports a 672 channels, each of 64 kbps. It is contemplated that in other embodiments, cards other than a T-3 card are utilized. The input to each of the one or more T-X cards may comprise a T-3 input that may connect to the back of the card. The card also communicates with the telephone network via multiplexer 412. In one embodiment the output of the T-X card comprises a digital signal. Access to the incoming signals is achieved via a bus interface 420 that also accesses the cards. In one embodiment the small computer system architecture standard oversees communication between the bus interface 420 and the one or more cards 418.

The output of the T-X device comprises a digital signal. It should be noted that the T-X card comprises any communication device capable of receiving and transmitting information at high speeds. In one embodiment the T-X card comprises a device capable of interface with the capacity of a T-3 line.

The bus interface 420 connects to a second bus 424, which facilitates communication between one or more compression devices 430. In the configuration described herein the compression devices 430 are also responsible for constructing the data into packet form for transmission over a packet-switched network and de-constructing packets for transmission in another format, such as serial data, analog signals, or other non-packet format. In one embodiment the compression devices 430 comprise computer cards designed to process 60 calls per card and dynamically achieve up to a 12 times compression ratio. One compression device capable of achieving such rates of compression is available from Audio Codes located in Yehud, Israel with offices in San Jose, Calif. It should be noted that in one embodiment the compression may be dynamically adjusted by the Interface, the M/R system, or other apparatus.

The telephony system 404 transfers the packet output of the compression devices 430 via communication line 436 to the switching hub 440. The switching hub operates in a manner known by those of ordinary skill in the art thereby providing output to connector 438. In the configuration described herein the hub 440 combines multiple IP streams on to the computer network. In one embodiment connectors 436, 438 comprise Base100T Ethernet cable connectors.

In one example embodiment, the switching system 402 comprises various control logic 441 in communication with the connector 438, one or more CPU devices 442, one or more memory units 444, and one or more storage media interface devices 446. In one configuration, these apparatus obtain power from the power hub 406. It is contemplated that the memory unit 444 can comprise RAM, ROM, hard disk drive, flash memory, disk drives, compact-disc optical media, or any other media suitable for the storage of data. The media interface 446 can comprise any device capable of input and output from data to the Interface, such as a CD-ROM drive. In other embodiments the media interface 446 can comprise a floppy disk drive, hard disk, interface port such as a parallel port, serial port, USB port or Ethernet port. The CPU 442 can comprise any processor or controller configured to execute software and other data processing operations. In one embodiment the CPU 442 comprises a Celeron brand processor as is commonly available from Intel Corp. of Oregon.

The control logic 441 interfaces with an input/output port connected to the Internet or some other computer network communication medium to thereby achieve data packet transfer into and out of the Interface. In one embodiment the Interface includes means to connect using a 10/100 Ethernet communication standard to achieve input/output to the computer network. In one embodiment the Interface includes means to connect one or more T-1 capacity lines or E-1 capacity lines to provide communication speeds at about 1.544 MBPS and 2.048 MBPS respectively.

The CPU 442 and memory 444 work in unison to facilitate packet transfer into and out of the computer switch system 402. In one embodiment the media interface 446 contains a compact disc having software stored thereon that facilitates operation of the Interface in the manner described herein. In alternative embodiments the compact disk may be left in the drive 446 during operation or the compact disk may be removed from the drive and the entire software stored in the memory 444. In the latter configuration the software is secure since the compact disk is not subject to theft.

Communication between the Interface and M/R system occurs In connection with the operation of the switch system 402 of the Interface. Details regarding the interaction between the Interface and the M/R system are provided below.

Operation of the Interface occurs in the following manner. It is contemplated that the Interface be connected to one or more high speed data lines 410 that provide signals containing call information, Including voice information and routing information to the Interface from some form of communication network connection, such as a connection to a central office, PBX, or switch. In other embodiments the Interface may process information other than voice information. It is further contemplated that the lines 410 comprise T-1 lines or T-3 lines capable of carrying multiplexed data. The de-multiplexer 412 demultiplexes the incoming multiplexed signal in a manner known in the art and provides the demultiplexed signal to the multiplexer bus 420. The multiplexer bus 416 communicates the incoming is signals to the one or more T-X communication cards 418.

The incoming data on lines 410 includes data regarding the desired destination of the incoming signals. In one configuration this information comprises a 7 digit or 10 digit numeric value representing a destination telephone number that accompanies call data. The destination number is utilized to preferably route the call to a destination Interface near the location of the destination number.

After processing by the T-X cards 418 the T-X card communicates the signal, via bus 424, to a compression device 430. In this example embodiment the compression card performs variable compression on the signal. In this embodiment the compression ratio is controlled by the CPU based on instructions from the M/R system and can vary dynamically.

After compression the compression device 430 outputs the signal on path 436 to the switching hub 440 wherein it is routed to control logic 441 via line 438. The control logic 441 monitors the packets and appends appropriate routing data to the header of the packet. The M/R system in conjunction with the switch system 402 and telephony system 404 creates the routing data based on the least-cost-routing algorithms, channel quality monitoring, and the destination of the call data.

The components of the switch system 402 transmit the packets on one or more cables via the Internet or other packet-switched network to another Interface configured to service the call destination. In other embodiments the Internet is avoided and data is sent via one or more dedicated or shared trunks or cables.

The M/R system can comprise any system capable of communicating with a computer network and executing algorithms embodied in software code. In one example embodiment, the M/R system comprises a network operations center computer system running the software to perform the tasks of the M/R system. The network operations center is a control hub for the entire system. In other embodiment the control center may be distributed to a plurality of centers or computers.

As described generally above, the M/R system acts as a central system to service the plurality of Interfaces and perform path analysis based on test packets sent between Interfaces. The M/R system also determines if and when to re-route a call, performs dynamic billing and accounting functions, effectuates least-cost-routing and dynamically compresses to compensate for increased latency. The operations of the M/R system execute in part on the Interfaces, and in at least one possible configuration, the M/R system is a distributed operation. It is contemplated that in other embodiments the M/R system can be eliminated and its tasks assigned to the Interfaces.

Operation

Having discussed one possible implementation example for the invention, the following discussion focuses on one possible example method of operation of the Interface systems and the M/R system of the present invention. For purposes of understanding, the operation of the invention is described in conjunction with a telephone network. In such a configuration, the operation achieves an coupling between the telephone network and a computer network, such as the Internet, to facilitate the transfer of voice or data communication over the computer network, and back to the telephone network at a remote location. In the embodiment described herein the transmission over the computer network is in packet form to more fully utilize available bandwidth and provide means to dynamically route and re-route calls. This is an advantage over a dedicated circuit scenario.

While the systems described herein will prove particularly useful for transmission of voice or video data from a first location to a second location, it is contemplated that types of data other than voice or video data may be transmitted. These types of data include any that are time sensitive. In addition, the system of the present invention advantageously provides a method and apparatus to transmit data over a computer network in packet form without suffering from the disadvantages of time delay. Delay in voice transmission is unacceptable. To overcome this disadvantage, the system described herein utilizes a monitoring and routing system to dynamically and in real time monitor the characteristics of the data transmission between two or more Interfaces. If the monitoring reveals that the signal received by a user is of low quality, the monitoring and routing system will direct the Inteface to re-route the transmission or alter another dimension of the transmission to improve quality.

Figure 8A:
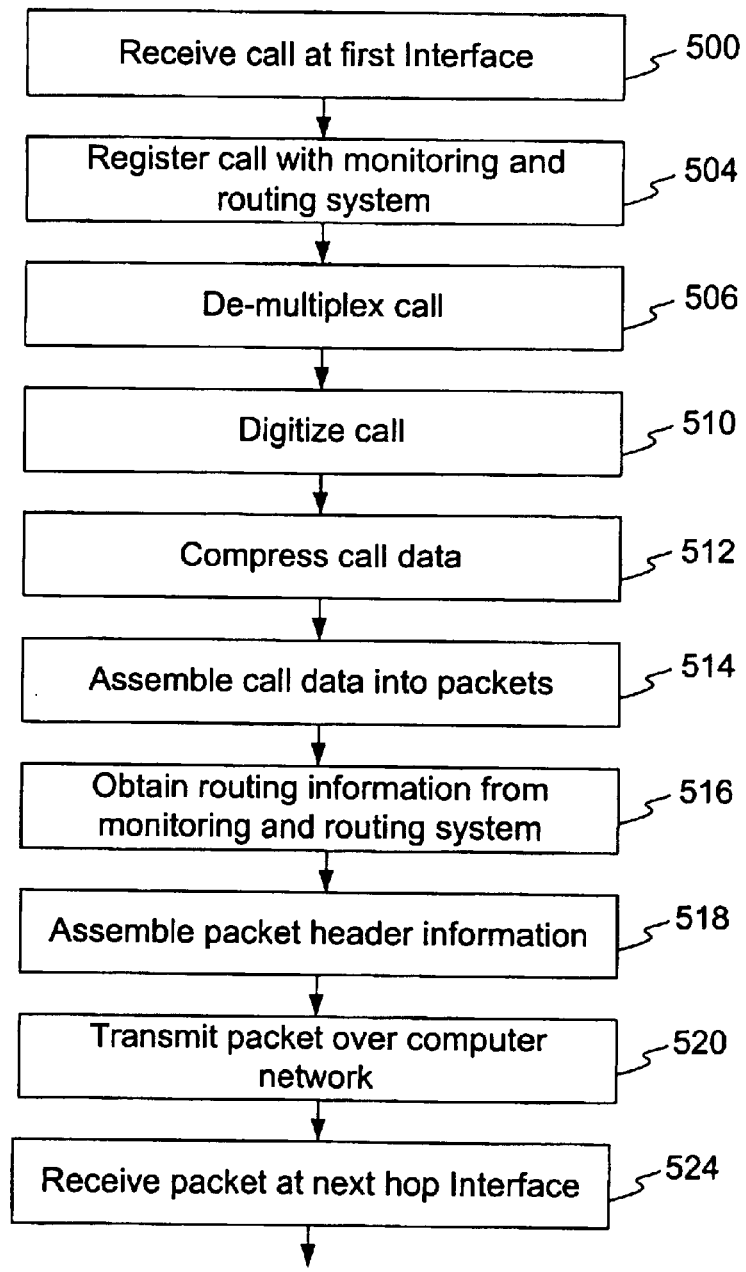
FIGS. 8A–8B illustrates an operational flow diagram of an example method of operation of the present invention.

FIG. 8A illustrates one possible method of operation. As shown, at a step 500 the Interface receives a call. For purposes of understanding, an individual may utilize a telephone to place a call to a remote location. The call travels to a central office and is eventually routed to a Interface for routing over a computer network. At a step 504 the operation registers the incoming call with the monitoring and routing system (M/R system) and obtains the destination data. The M/R system is now able to track the call and monitor its progress for purposes including billing and quality monitoring. It is contemplated that in some versions of the M/R system upon receiving notification of the call and the call destination, the M/R system initiates a process of determining a preferred routing path. In one configuration, the M/R system utilizes least-cost-routing depending on existing patterns and rates.

Next, at a step 506 the de-multiplexing hardware of the Interface demultiplexes the call. This step is necessary if the call is received over a high capacity line in multiplexed format. Thereafter, the operation may optionally digitize the call, if necessary, step 510, and compress the digital call data, step 512. In one embodiment the compression is variable and may be adjusted to account for transmission characteristics and network behavior. In one embodiment, the compression ratio is up to 12 times compression.

Thereafter, at a step 514, the operation converts the call data into packets of call data. Next, at a step 516, the Interface obtains data from the M/R system regarding the preferred routing information. This may include the final point of presence and the destination trunk. At a step 518 the header information is assembled into a packet header and associated with the appropriate call data packet. This occurs in a manner known in the art and is accordingly not discussed in great detail herein.

After assembly the system transmits the packet over the computer network based on the routing of the header information. This occurs at a step 520.

After traveling through the computer network the packet arrives at the destination Interface at a step 524. It is contemplated that the packet may travel through one or more routers or other processing devices as it progresses through the computer network.

Figure 8B:
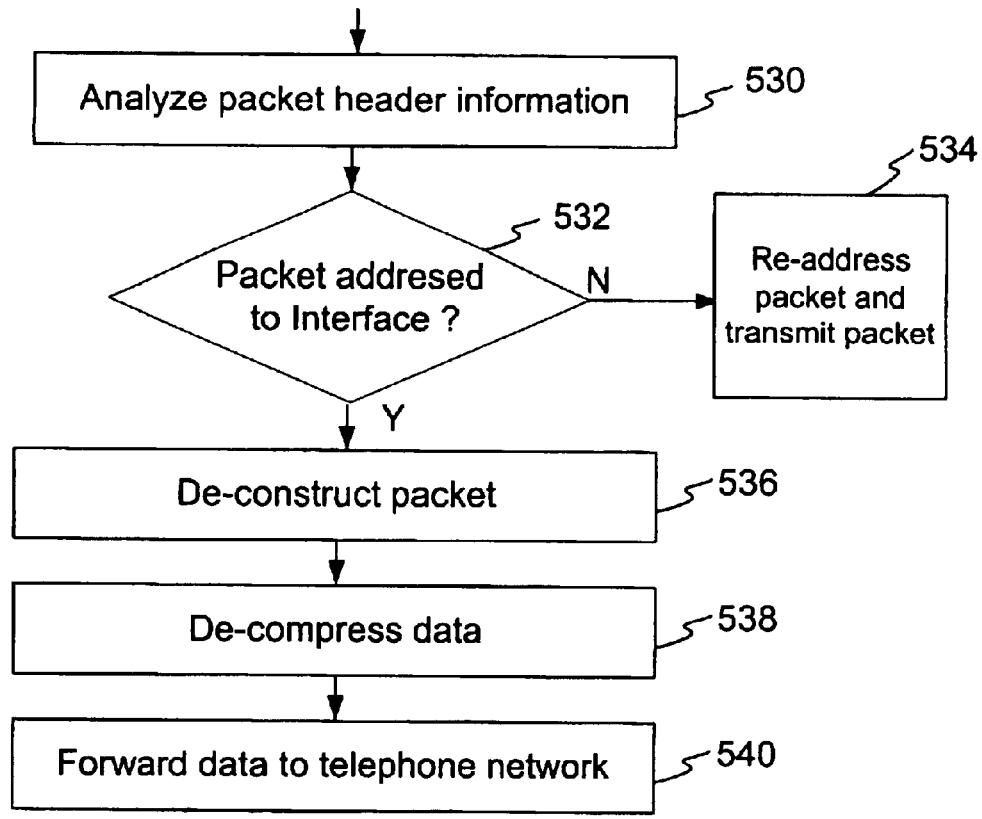

After receipt at next hop Interface, step 530, FIG. 8B, the next hop Interface analyzes the packet header information. At decision step 532 the next hop Interface determines if the packet is addressed to the Interface. If it is not addressed to the Interface, the packet is re-addressed to the next hop and the packet re-transmitted. This is shown at a step 534. Alternatively, if the packet is at its destination, the operation progresses to step 536 and the hardware and software of the Interface de-constructs the packet to extract the desired data. Thereafter, at a step 538, the data are de-compressed and at a step 540 the data are forwarded to the telephone network via the proper port on the Interface. The final Interface is referred to herein as the destination Interface.

Although the process describes a method of operation in terms of single data packets, it is understood that the process covers transmission of numerous packets in a generally similar manner. Likewise, although the process is described in terms of transmission from a first Interface to a second or destination Interface, it is understood that communications occur in both directions among the any of two or more Interfaces utilizing a similar process.

The present invention may also include desirable aspects to maximize the quality of call or transmission prior to call set-up and during the call. One example comprises monitoring various communication paths or routing schemes prior to the time the call is received at the Interface so that the M/R system can assign an ideal path to the incoming call.

Figure 9:
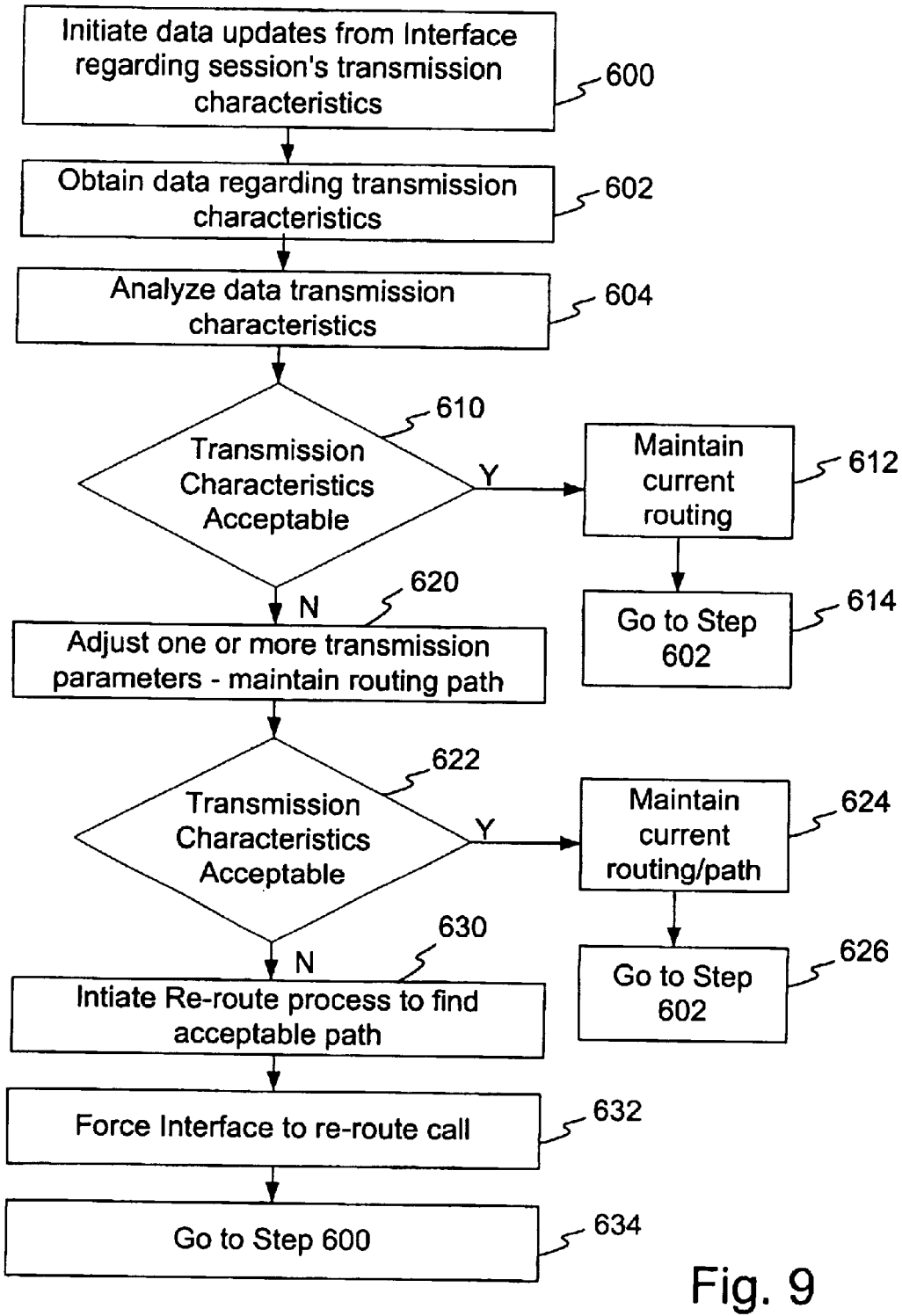
FIG. 9 illustrates an operational flow diagram of an example method of call monitoring and re-routing.

Another desirable feature of the present invention comprises monitoring of transmission characteristics during the communication session, that is, during the call, as the communication session progresses. It is contemplated that the packets may be routed to more than one Interface before the packet reaches the destination Interface. FIG. 9 illustrates an operational flow diagram of an exemplary method of monitoring a communication session. During a communication session, at step 600, the M/R system initiates an update process or receives data from the each Interface participating in the communication session regarding the session's transmission characteristics and/or the behavior and operation of the path over which packets were presently being sent. This can be achieved in several ways or in any combination of ways. One possible method comprises sending ping packets between Interfaces to reveal path characteristics. Another method comprises monitoring and analyzing any type of packet sent between Interfaces.

The transmission characteristics of the path define one or more aspects of the routing path and how the path affects the packet. The effect on the packet may comprise jitter, bit error (represented as bit error rate), latency, or packet loss. Once this process is initiated, the M/R system receives the data at a step 602. In one embodiment this information is received over the same or similar computer network over which the communication session packets are being transmitted. In another embodiment the characteristic data are received via a dedicated channel.

Next, at a step 604 the M/R system analyzes the received data to determine the characteristics of the communication session. In one particular embodiment, the characteristics comprise the quality or acceptability of the communication between a sending Interface and a receiving Interface. For example, it is desirable for voice communication to be of a certain quality level to understand or enjoy the conversation. Problems with voice communication can comprise lost speech, jitter, delay, echo, or dropped calls.

After analysis of the data obtained from the Interfaces, the operation progresses to decision step 610 wherein the M/R determines if the transmission characteristics of the communication session are acceptable. Various factors determine if the characteristics are acceptable as can be envisioned by those of ordinary skill in the art. Various quality standards may be applied based on user determinable factors and system utilization.

If the characteristics are deemed to be acceptable, at step 612 the operation maintains the current routing of the communication session and thereafter progresses to a step 614 where the operation returns to the step 602. The operation continues in this manner to continually and in real time monitor the communication session and path. In other embodiments the update process can occur at any various interval.

If at step 610 the operation determines that the transmission characteristics are below a desired quality level the operation executes step 620 to adjust one or more parameters of the communication session. In one execution the compression rate is adjusted to increase call quality. In another execution a process or interpolation is utilized to further improve speech quality. It is contemplated that the adjustments made during step 620 do not include re-routing of the call.

After adjustment to the transmission parameters, the operation progresses to a decision step 622. At decision step 622, the operation again determines if the transmission characteristics, as determined by the updates received from the Interfaces handing the particular call or communication session are within acceptable limits. If the adjustments have improved the transmission characteristics the operation goes to steps 624 and 626. These steps are generally identical to steps 612 and 614 discussed above.

Alternatively, if at decision step 622 the transmission characteristics are not acceptable, the operation, at a step 630, initiates a re-routing of the communication session to a different path. In another example a different path is selected by the M/R system based on the monitoring of alternate paths by the M/R system and Interfaces to find acceptable alternate routing paths.

Next, after determining an alternate and acceptable re-routing, the M/R system forces the Interface to re-route the call on the new path at step 632. As is understood, packets are routed in various paths and manner by altering the content of the packet header. In one embodiment the packets are bounced to another Interface. After the M/R system and Interface re-route the call the operation returns to a step 600 at step 634.

Figure 10:
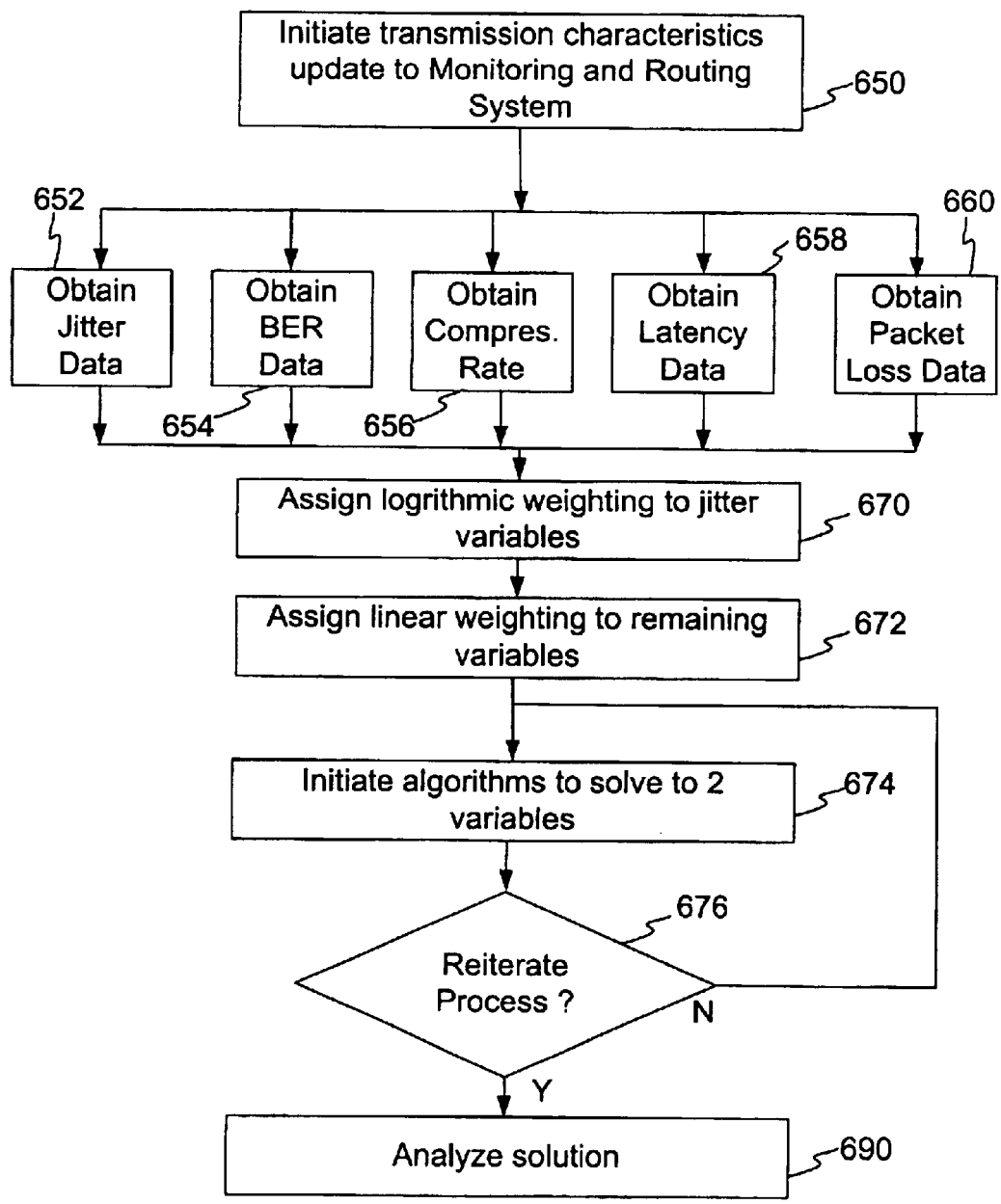
FIG. 10 illustrates an operational flow diagram of an example method of call quality analysis.

FIG. 10 illustrates a more detailed operation flow diagram of the process of analyzing the data transmission characteristics as shown in step 604 of FIG. 9. It is contemplated that in one embodiment one or more software modules are utilized to perform this analysis. In operation, an update of the transmission characteristic data is sent to one or more modules (hardware and/or software) for analysis by the M/R system at step 650. In one embodiment, these data are obtained in packet form over a computer network. Next, at steps 652-660, the operation obtains the data that define the transmission characteristics. In this embodiment, this information comprises jitter 652, bit error rate (BE) 654, compression rate 656 latency 658 and packet loss 660. In one example method of analysis, at a step 670, the system assigns logarithmic weighting to the data representing jitter. Next, at a step 672, the analysis module assigns linear weighting to the remaining variables. It is contemplated that the systems described herein are not limited to one particular method or particular manner of analysis, such as logarithmic or linear weighting, of the data received. For example, in an alternative embodiment, analysis comprising direct time scale comparison is utilized. One implementation of direct time scale comparison comprises comparison of the time required for a packet, such as a ping, to complete a first route as compared to a second route. Next, at a step 674, the operation initiates execution of algorithms to solve the equations to determine routing parameters. In one configuration, this comprises initiating algorithms to solve the above-mentioned data values to obtain a desired Interface to designate as the destination. At a step 676 a decision is made whether the analysis has been complete. If the process is not complete, the process is reiterated by returning to a step 674. If at decision step 676 the algorithms have determined the desired solution, the operation progresses to a step 690 wherein the M/R system analyzes the results to determine if the routing is acceptable. If the routing is not in acceptable, the call can be re-routed along a different path in the computer network. It is contemplated that the call can be re-routed numerous time during the communication session.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method for maintaining desirable transmission characteristics when sending data packets during a communication session occurring over a current path between a first interface and a second interface, each interface comprising a telephone network port and a computer network port, said first and second interfaces each being respectively located at a first and a second location on a computer network comprising:

transmitting test packets from said first location to said second location over each of a plurality of paths including said current path, said paths other than said current path comprising a third location in each said path intermediate said first location and said second location;

evaluating said test packets to determine acceptability of each path in response to the effect on said data packets of transmitting packets from said first location to said second location in each path;

monitoring each path within the plurality of paths from the first location to the second location and identifying an acceptable best path different from said current path; and if said evaluating determines the effect on said data packets in said current path to be unacceptable, sending said data packets on one said acceptable path via the third location prior to sending said data packets to said second location.

2. The method of claim 1, wherein one said effect on said data packets comprises latency.

3. The method of claim 1, wherein an undesirable effect on said data packets comprises degrading the quality of communication between said first location and said second location that inhibits voice communication.

4. A method for maintaining desirable transmission characteristics when sending data packets during a communication session occurring between a first location and a second location on a computer network over a current path between a first interface and a second interface, each interface comprising a telephone network port and a computer network port, said first and second interfaces each being respectively located at a first and a second location on a computer network comprising:

transmitting data packets from said first location to said second location over each of a plurality of paths including said current path, said paths other than said current path comprising a third location in each said path intermediate said first location and said second location;

evaluating said data packets to determine the effect on said data packets of transmitting packets from said first location to said second location in each path;

monitoring each path within the plurality of paths from the first location to the second location and identifying an acceptable path different from said current path; and if said evaluating determines the effect on said data packets in said current path to be unacceptable, sending said data packets on said acceptable path via the third location prior to sending said data packets to said second location.

5. The method of claim 4, wherein one said effect on said data packets comprises latency.

6. In a digital communications network, a monitoring and routing system for maintaining desirable transmission characteristics when sending data packets during a communication session occurring between a first interface and a second interface, each interface comprising a telephone network port and a computer network port, said first and second interfaces each being respectively located at a first and a second location on a computer network comprising:

means for controlling route selection between said first location and said second location;

means for transmitting path characteristic packets to determine the effect on said data packets of transmitting said data packets over each of a plurality of paths including a current oath from said first location to said second location, said paths other than said current path comprising a third location in each said path intermediate said first location and said second location;

means monitoring each path within the plurality of paths from the first location to the second location and determining if the effect on said data packets in each said path is acceptable;

said route selection means being responsive to an evaluation that the effect on said data packets in each path and selecting a best path;

said monitoring means monitoring the best path and evaluating said path characteristics; and means responsive to an evaluation that the effect on said data packets in the current oath is unacceptable to select a route so that said data packets are sent via the third location in an acceptable path other than said current Path prior to sending said data packets to said second location.

7. The monitoring and routing system of claim 6, wherein said path characteristic packets comprise test packets.

8. The monitoring and routing system of claim 6, wherein said path characteristic packets comprise data packets.

9. The monitoring and routing system of claim 6, wherein said path characteristic packets comprise pings.

* * * * *

UNITED STATES PATENT AND TRADEMARK OFFICE
CERTIFICATE OF CORRECTION

PATENT NO.    : 6,907,000 B1
DATED         : June 14, 2005
INVENTOR(S)   : Host

It is certified that error appears in the above-identified patent and that said Letters Patent is hereby corrected as shown below:

<u>Column 16,</u>
Line 41, please delete "oath" and replace with -- path --.
Line 44, please delete "Path" and replace with -- path --.

Signed and Sealed this

Sixteenth Day of August, 2005

JON W. DUDAS
*Director of the United States Patent and Trademark Office*